Dec. 31, 1935.  A. F. POOLE  2,025,894

ELECTRIC CLOCK

Filed Oct. 29, 1931

INVENTOR.

Arthur F. Poole

Patented Dec. 31, 1935

2,025,894

UNITED STATES PATENT OFFICE 2,025,894

ELECTRIC CLOCK

Arthur F. Poole, Ithaca, N. Y.; Maryline B. Poole, administratrix of said Arthur F. Poole, deceased, assignor to Maryline B. Poole, Ithaca, N. Y.

Application October 29, 1931, Serial No. 571,739

6 Claims. (Cl. 58—26)

My invention is an electric clock and is preferably suited to be actuated by a source of regulated alternating current, by which current I mean an alternating current whose frequency is closely regulated by periodic comparisons with a master clock to the end that the average number of cycles sent out each second is held constant, usually 60. A system of this kind and means for regulating the frequency is shown in my issued Patent #1,310,372 of 1919. The secondary clocks shown in said patent consist of synchronous motors running in step with the regulated current and suitably geared to clock hands.

It is one of the objects of my present invention to improve the secondary clocks used in systems of this type by replacing the synchronous motor by a simple oscillating system whose oscillations are maintained by the regulated current and also held in step therewith, the resulting structure being cheaper than a motor. A further object of my invention is the provision of a device to maintain the clock in operation in the event the current is interrupted. Another object of my invention is the provision of a clock which will run from a source of current which is not regulated and will still keep running when said current is interrupted. A further object of my invention is the use of improved contact means and circuit therefor, particularly in the use of a triode as a species of relay to make the contact operation more certain. The above and other objects of my invention will be evident to those skilled in the art from the following specification and will be set forth in the claims.

Figure 1:
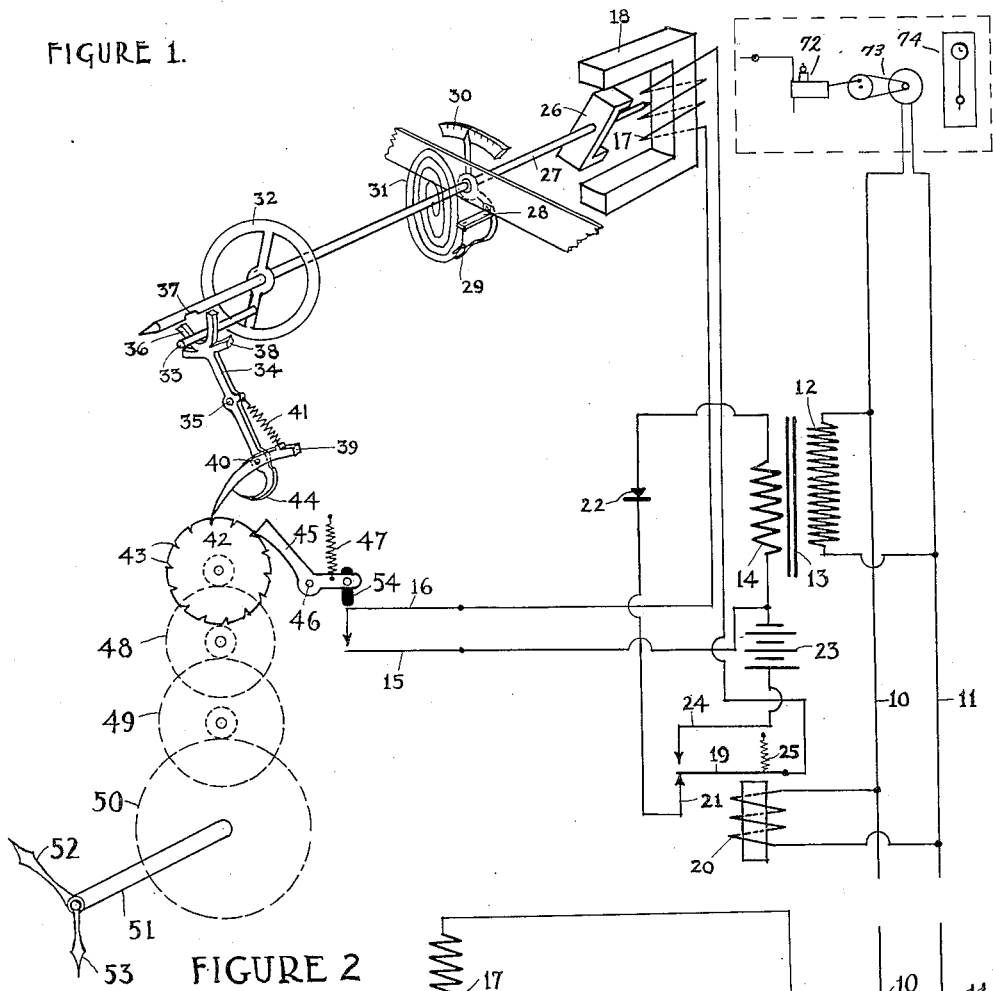
Figure 2:
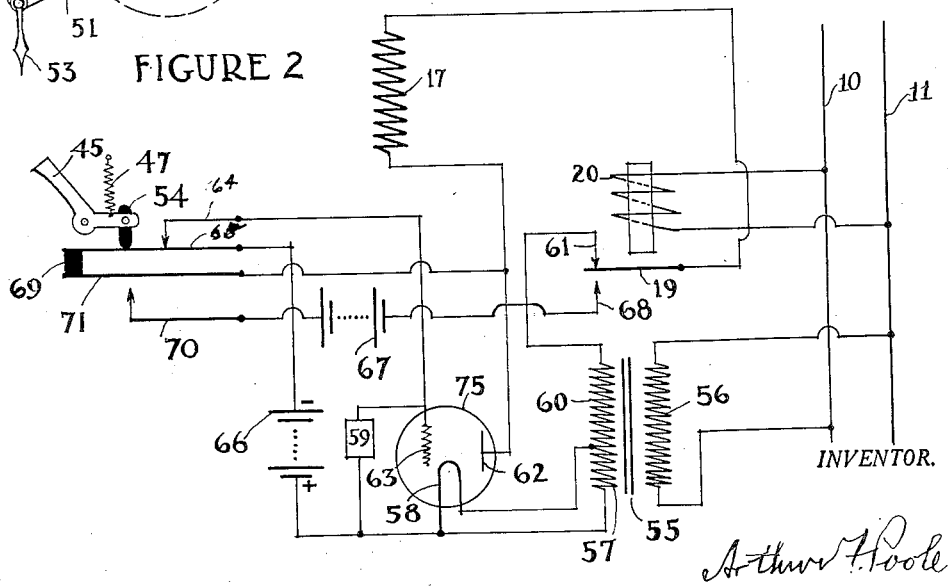

My invention will be best understood by reference to the figures of which: Fig. 1 is a diagrammatic view of my improved clock and the circuit therefor and Fig. 2 is an alternative circuit. Like numbers of reference designate the same parts in both figures.

In Fig. 1, 10 and 11 are line wires carrying the current used for light and power, said current being generated by alternator 73 driven by prime mover 72, the frequency preferably being regulated by comparison with master clock 74. To these mains is connected a primary winding 12 of a transformer 13 having a secondary winding 14 to reduce the line voltage to a suitable potential. From one side of the winding 14 a circuit may be traced to a contact spring 15 and a co-operating spring 16 which is connected to a winding 17 on an electromagnet 18. The other side of the winding 17 is connected to the armature 19 of a relay 20 connected to the mains 10 and 11. The armature 19 contacts with a contact 21 which is connected through a rectifier 22 to the transformer winding 14. From the circuit just described it is evident that when the current is on the mains 10 and 11 the magnet 18 will be excited by a pulsating direct current of the same frequency as the current in the mains 10 and 11 each time the contact springs 15 and 16 are closed. To provide for the excitation of the magnet 18 during a period of interruption of current in the mains 10 and 11 I have provided a battery 23 connected on one side to the winding 14 and on the other to an upper contact 24 of the relay 20. When there is no current on the mains 10 and 11, the relay armature 19 will be drawn by a spring 25 to the upper contact 24 and the battery 23 will replace the winding 14 as a source of current for the magnet 18 each time the contacts 15 and 16 are closed.

I will now describe the mechanism by which the contacts 15 and 16 are closed. The magnet 18 has an armature 26 swung between its poles by a shaft 27. The poles of the magnet 18 are turned to a circle about the shaft 27 and the ends of the armature 26 are turned to a smaller circle about the same center so that the armature 26 may swing freely. The armature 26 is rigid on the shaft 27 to which is also attached a hairspring 31 whose outer end is secured to a stud 28 in the framework. A regulator 29 serves to adjust the effective length of the spring 31 and is provided with an indicator and scale 30. Rigid with the shaft 27 is a balance wheel 32 and said shaft is provided with anti-friction bearings (not shown) so as to oscillate freely in a period determined by the spring 31 and the parts attached to said shaft. In the present specification I will assume this period as 120 complete oscillations per minute, altho this exact period is not material. With a regulated current of 3600 cycles per minute any integral sub-multiple of 3600 (e. g. 60, 90, 180 etc.) will answer. The balance 32 carries a roller pin 33 which drives a lever 34 pivoted in the framework at 35 by a reversal of the well known fork and roller action of an alarm clock. However in the present instance the balance drives the fork instead of the fork driving the balance. The lever 34 is provided with a fork 36 engaging the roller 33 and at each vibration of the balance 32 the lever 34 is vibrated by the action of the fork 36 being driven by the roller 33. The shaft 27 is provided with the usual passing notch 37 and the fork 36 with guard prongs 38 to insure that the fork 36 is held in the proper position when the balance is detached therefrom. This fork and roller action is well known to those skilled in the art and need not further be described.

The lever 34 actuates the clock wheels by a driving pawl 39 pivoted on the lever 34 at 40 and held by a spring 41 in contact with a wheel 42 having teeth 43. A guard 44 on the lever 34 prevents excess motion of the pawl 39. Backward motion of the wheel 42 is prevented by a click 45 pivoted in the framework at 46 and held in contact with the wheel 42 by a spring 47. The wheel 42 is connected by gears 48 and 49 to a center wheel 50 having a shaft 51 serving to carry a minute hand 52. An hour hand 53 is joined thereto by the customary motion work (not shown). Oscillation of the balance 32 will feed the wheel 42 step by step and this motion will result in proper motion of the hands 52 and 53.

To provide for closure of the contacts 15 and 16, the click carries an insulated stud 54 which at each motion or step of the wheel 42 closes the springs 15—16 momentarily as the click 45 rides on the circumference of the wheel 42 in passing from one tooth 43 to the next. Thus the magnet 18 is energized and attracts its armature 26 at each oscillation of the shaft 27 and attached parts. The arrangement is such that the contacts 16—15 are made when the armature is in the position shown in Fig. 1 and are broken when the armature 26 is in line with the poles of the magnet 18, this cuts off the current and the armature 26 swings on under its own momentum to the end of its swing. On the return stroke of the armature 26 the magnet 18 is not energized since the lever 34 simply takes up a new tooth 43 on the wheel 42.

The above arrangement will work on any alternating current whether regulated or not, however the most advantageous use of my invention is that using a regulated current as a source of supply. In this case the armature 26 vibrates in step with said current and the clock hands reproduce the accuracy of the current frequency. This follows from the fact that the armature 26 finds an equilibrium position, or phase, where the point of cut off of the pulsating wave is such that if the armature gets fast, the impulse is less thereby slowing the armature to bring it into phase. On the other hand any lag in the armature results in an increased impulse and consequent acceleration of the armature.

The rectifier 22 may be of any suitable construction, the low voltage of the winding 14 makes a copper oxide rectifier convenient. The current through the coil 17 consists of a succession of pulses in the same direction during the time the relay 20 is in the position shown in Fig. 1, that is when the clock is run from the current mains 10 and 11. When the relay is de-energized, the current is supplied from the battery 23 and is a steady direct current. The battery 23 may be composed of dry cells since the current drain therefrom is small, being confined to the time the line current is interrupted. Consequently the life of the battery 23 is the shelf life.

While for the sake of clearness, I have shown the relay 20 as separate from the transformer 13 in practice the relay armature may be actuated from the leak field of the transformer 13 since both the relay 20 and the transformer 13 are actuated coincidently. The armature 19 is made sluggish to avoid chatter from the alternating current.

Fig. 2 shows a modification of the circuit connections in which a triode is used as means for controlling the winding 17 of the magnet 18. A transformer 55 has its primary winding 56 connected to the mains 10 and 11. It has a secondary winding 57 which furnishes current for the filament 58 of a triode 75. A winding 60 furnishes plate current and a circuit may be traced from said winding 60 through the contact 61 and the armature 19 of the relay 20 to the winding 17 of the magnet 18. From the winding 17 a wire leads to the plate 62 of the triode 75. The grid 63 of said triode is connected to a contact spring 64 normally in contact with a spring 65 connected to a "C" battery 66 joined to the filament 58. A grid leak 59 is between the grid and the filament. The battery 66 gives the grid a negative bias thus preventing flow of plate current except when the contacts 64—65 are opened by the action of the click 45 as previously described.

To run the clock when the current is off the mains 10—11 I have provided a battery 67 connected between a contact 68 of the relay 20 and a spring 70, contact with which is made by a spring 71 actuated by the insulating block 69 coincident with the actuation of the spring 65. Said spring 71 is joined to the plate 62 as shown.

The use of the circuit shown in Fig. 2 is of advantage in that the contacts 64—65 controlling the winding 17 require less attention to keep clean than the contacts 15—16. The current broken at the contacts 64—65 is of the order of a few microamperes and there is no corrosion. However this added reliability must be paid for by the increased cost of the triode 75, both first cost and replacement. Which circuit is best to use is determined by the particular case in which my clock is used.

While I have shown my clock actuated by an alternating source it will be evident to those skilled in the art that (in the circuit shown in Fig. 1) a direct current on the mains 10 and 11 could be used. All that is needed to make the change is to replace the transformer 13 by a high resistance and to join suitable points on said resistance to the wires leading to the low winding 14. A low voltage direct current will thus be obtained. The rectifier 22 is of course omitted. A like change will take care of the circuit shown in Fig. 2. When direct current is used the regulation of the clock by the frequency is not present, the time kept by the clock is determined by the uniformity of the oscillation of the system on the shaft 27.

The advantages of my invention will be apparent to those skilled in the art. Many changes and modifications may be made in the precise structure herein disclosed without departing from the spirit of my invention since I claim:

1. In an electric clock the combination of a source of regulated periodic current, a rectifier to transform said current into a pulsating current of the same frequency as said regulated current, a vibrator, time indicating means driven from said vibrator, an armature on said vibrator, an electromagnet adapted to be energized by said pulsating current and then to act on said vibrator, an electric circuit including said rectifier and electromagnet and a circuit breaking device actuated in synchronism with said vibrator to close said circuit at a certain position of said vibrator.

2. In an electric clock the combination of a source of regulated periodic current, a vibrator tuned to approximately a submultiple frequency of said current, time indicating means driven from said vibrator, an armature on said vibrator, an electromagnet acting on said armature, an electric circuit including said current source and said electromagnet and a circuit closing device actuated in synchronism with said vibrator to close said circuit at a certain position of said vibrator whereby said vibrator is held in step with said current.

3. In an electric clock the combination of a source of alternating current of regulated frequency, a vibrator tuned to a submultiple of said regulated frequency, time indicating means driven by said vibrator, contacts actuated by said vibrator, an armature on said vibrator, an electromagnet associated with said armature, and an electric circuit fed by said source of current including a triode having said contacts in the grid circuit and said electromagnet in the plate circuit, whereby said vibrator is kept in step with said current.

4. In an electric clock the combination of a source of alternating current of regulated frequency, a battery located in said clock, time indicating means, a vibrating system tuned to a submultiple of said regulated frequency to drive said time indicating means, an armature associated with said vibrating system, an electromagnet associated with said armature, said magnet being responsive to either said regulated current or said battery current, a switch located in said clock operated by said first source of current to determine which source of current shall be effective on said magnet, and a circuit fed by said source of alternating current and said battery and including said switch and said electromagnet.

5. In an electric clock the combination of a source of alternating current of regulated frequency, a battery, time indicating means, a vibrating system tuned to a submultiple of said regulated frequency to drive said indicating means including an armature, an electromagnet for driving said armature, a switch for determining whether said battery or said source of alternating current shall energize said electromagnet, an electric circuit fed by said battery and said source of alternating current including said switch and said electromagnet, and means operated by said regulated current on failure of said current to operate said switch.

6. In an electric clock the combination of a source of alternating current of regulated frequency, a source of direct current, an electromagnet, a switch for determining which of said sources shall operate said electromagnet responsive to a failure of said source of alternating current, an electric circuit including said two sources of current said switch and said electromagnet, timekeeping means kept in motion by the action of said electromagnet, said timekeeping means being constructed so that it motion will be kept in step with said alternating current source when said magnet is connected to said alternating current source, and time indicating means driven by said timekeeping means.

ARTHUR F. POOLE.